(12) United States Patent
Burkhard et al.

(10) Patent No.: US 11,078,942 B2
(45) Date of Patent: Aug. 3, 2021

(54) INSERT SYSTEM, INSERT AND PANEL ASSEMBLY

(71) Applicant: RUAG SCHWEIZ AG, Emmen (CH)

(72) Inventors: Gregor Burkhard, Olten (CH); Dominik Christian Nägeli, Amriswil (CH); Dominic Schori, Wettingen (CH); Laurent Repond, Zürich (CH)

(73) Assignee: RUAG SCHWEIZ AG, Emmen (CH)

( * ) Notice: Subject to any disclaimer, the term of this patent is extended or adjusted under 35 U.S.C. 154(b) by 136 days.

(21) Appl. No.: 16/306,381

(22) PCT Filed: May 31, 2017

(86) PCT No.: PCT/EP2017/063203
§ 371 (c)(1),
(2) Date: Nov. 30, 2018

(87) PCT Pub. No.: WO2017/207658
PCT Pub. Date: Dec. 7, 2017

(65) Prior Publication Data
US 2019/0186520 A1    Jun. 20, 2019

Related U.S. Application Data

(60) Provisional application No. 62/343,419, filed on May 31, 2016, provisional application No. 62/359,281, filed on Jul. 7, 2016.

(51) Int. Cl.
*F16B 13/14* (2006.01)
*F16B 5/01* (2006.01)

(52) U.S. Cl.
CPC .............. *F16B 13/141* (2013.01); *F16B 5/01* (2013.01); *F16B 13/144* (2013.01)

(58) Field of Classification Search
CPC .... F16B 13/144; F16B 13/141; F16B 13/146; F16B 13/143; F16B 11/006; F16B 5/01
(Continued)

(56) References Cited

U.S. PATENT DOCUMENTS 2,092,341 A * 9/1937 De Vries ............... F16B 13/143
                                                        52/704
3,485,282 A    12/1969 Lopez et al.
(Continued)

FOREIGN PATENT DOCUMENTS

EP    2 172 318 A1    4/2010
EP    2 781 762 A1    9/2014
(Continued)

*Primary Examiner* — Flemming Saether
(74) *Attorney, Agent, or Firm* — Pauley Erickson & Swanson (57) ABSTRACT

The invention is directed to an insert system comprising an insert with a base and an outer skirt extending from the base, thereby forming a chamber. The outer skirt is provided with a first inner skirt surface and a first outer skirt surface. The insert system further comprises a panel with a core structure and a first cover sheet that at least partially covers the core structure. The first cover sheet defines a first outer panel surface and has an opening. At least one piston is arranged in the opening and beneath the first outer panel surface. According to the invention the piston during mounting of the insert sweeps into the chamber to discharge an adhesive agent from the chamber into the core structure via at least one pathway.

17 Claims, 8 Drawing Sheets

(58) Field of Classification Search
USPC .................................................. 411/82, 82.3
See application file for complete search history.

(56) References Cited

U.S. PATENT DOCUMENTS

| | | | |
|---|---|---|---|
| 3,716,092 A | | 2/1973 | Serewicz |
| 4,425,065 A | * | 1/1984 | Sweeney ............... F16B 13/143 156/92 |
| 6,017,176 A | * | 1/2000 | Marui ................... F16B 37/048 411/258 |
| 8,087,149 B2 | * | 1/2012 | Wang ........................ F16B 5/04 29/525.06 |
| 8,251,625 B2 | * | 8/2012 | Zimmer .............. F16B 13/0858 411/82 |
| 8,287,218 B2 | * | 10/2012 | Zimmer ................ F16B 13/144 411/82 |
| 2009/0326702 A1 | | 12/2009 | Kuntz et al. |
| 2010/0287874 A1 | | 11/2010 | Zimmer et al. |

FOREIGN PATENT DOCUMENTS

| | | |
|---|---|---|
| EP | 2 781 763 A1 | 9/2014 |
| WO | WO 2014/060027 A1 | 4/2014 |
| WO | WO 2014/146739 A1 | 9/2014 |
| WO | WO 2014/146740 A1 | 9/2014 |

\* cited by examiner

INSERT SYSTEM, INSERT AND PANEL ASSEMBLY

BACKGROUND OF THE INVENTION

Field of the Invention

The present invention is directed to an insert system, in particular to an insert system to be used in panels with a core structure made from a cellular solid, such as honeycomb panels. As well, the invention is directed to an insert for such an insert system and to a panel assembly comprising at least one such insert system. The present invention is also directed to a method to produce such an insert system as well as to a device to perform such a method, respectively to produce such an insert system.

Discussion of Related Art

Several types of insert systems suited for being used in panels with core structures made from cellular solids are known.

U.S. Pat. No. 3,716,092 A was published on Apr. 14, 1970 on behalf of Illinois Tool Works Inc. The document discloses an insert for panels, in particular for honeycomb panels, and a method of assembling insert structures with such panels. According to the publication, the insert has an internally threaded section that extends from a base section adapted to be positioned adjacent the inner surface of a skin of the panel. An annular thermoplastic section adjacently surrounds the periphery of the threaded section. As well, an annular collar adjacently superimposes the outer extremity of the annular section. The document discloses a process of first melting the thermoplastic annular section by heat that is introduced (e.g. by induction or application of ultrasonic energy) from or through the collar. Subsequently, the molten thermoplastic material flows into a pre-formed aperture in the panel. Upon cooling, the thermoplastic material will solidify, leading to a bond between the insert and the panel. Such a system requires using a thermoplastic material and hence local application of heat, which is relatively expensive with respect to time and special heating devices required. As well, local deposition of thermal energy may affect the structural integrity of the panel.

U.S. Pat. No. 3,485,282 was published on Dec. 23, 1969 on behalf of Hughes Aircraft Company and shows an expandable insert for solid and cellular structures, like honeycomb constructions. The insert disclosed comprises a specific amount of expandable bonding agent that is specifically or precisely measured. In one embodiment disclosed in U.S. Pat. No. 3,485,282, the insert comprises a cylindrical casing which has a plurality of apertures spaced about its periphery. An attachment as a nut is secured centrally within the casing. Within the casing, an expandable bonding agent is arranged. In order to install the insert in a cellular structure, the insert is placed within a preformed hole in the cellular structure. After that, a catalyzing agent, namely heat, is applied to the insert which causes the expandable bonding agent to expand and through the apertures in the casing and hence extrude into the peri-insert cells opened by the hole in the cellular structure. According to the publication, the bonding means then expands until it fills completely all ruptured cells. A disadvantage of such an insert is that heat or another catalyst has to be induced which may affect the surrounding cellular structure. As well, in order to completely fill all ruptured cells a certain minimum volume of expandable bonding agent is needed which will stay within the case and hence adds to the total weight of the insert, although it does not contribute to fixation of the insert in the surrounding cellular structure.

US 2009326702 was published on Apr. 30, 2015 on behalf of Thales and discloses a method and device for fitting inserts in a structure (such as a sandwich structure) by bonding through controlled polymerization. The publication discloses in a first step to assemble a fitting vehicle comprising an insert to be fitted and an applicator as well as a polymerizable adhesive. In a second step, polymerization of the adhesive in the fitting vehicle is initiated. In a third step, the insert is fitted in an orifice formed in the structure by applying the fitting vehicle to the structure and triggering the applicator of the fitting vehicle. The document discloses a fitting vehicle to fit an insert in an orifice formed in the structure. The applicator comprises an open enclosure in which the insert and the adhesive can be held. The applicator further comprises deployment means that are able to push back the insert and the adhesive out of the open enclosure to allow the insert to be fitted in an orifice in the structure. A disadvantage of such an approach is that in order to obtain precise positioning of the fitting insert with respect to the structure, as well as to obtain proper embedding in the structure, the fitting insert still has to be held in position for some time after insertion into the structure. As well, contamination of the structure's outer surface with adhesive cannot be ruled out.

In the name of the applicant of the present application, documents WO 14060027A1, WO 14146739A1, WO 14146740A1 have been published, which all disclose inserts for being mounted in panels using adhesives.

SUMMARY OF THE INVENTION

Many inserts foreseen to be mounted into panels have the drawback that they have to be held in place using special tools during curing/hardening of an adhesive agent used for the insertion. Otherwise, correct positioning and alignment cannot be ensured as the adhesive agent, which has been brought into the structure, does not provide sufficient initial stability to the insert. Using such auxiliary positioning tools becomes particularly problematic as soon as high numbers of inserts have to be mounted in structures, which e.g. often is the case for panels used in aeronautics, such as for satellites, where several hundred or thousand inserts may have to be mounted in a panel.

Another problem known for sandwich structures that comprise core structures made from cellular solids is that adhesive agent tends to flow to regions of the core structure, which do not contribute significantly to insert strength. This in particular holds true for honeycomb panels in which the honeycomb cells typically continuously extend between the cover sheets of the panels.

In order to solve at least one of the aforementioned problems, an insert system according to the present invention typically comprises an insert with a base and an outer skirt extending from the base, thereby forming a chamber to receive an adhesive. Said outer skirt is provided with a first inner skirt surface and a first outer skirt surface. The insert system further comprises a panel which has a core structure and a first cover sheet that at least partially covers the core structure. The first cover sheet, respectively the outer surface of the first cover sheet, defines a first outer panel surface and has an opening. At least one piston is arranged in the opening and beneath the first outer panel surface. The opening and the piston are foreseen to interact with the insert in that when the insert is inserted into the opening, the piston sweeps into the chamber to discharge an adhesive agent from the chamber into the core structure via at least one pathway.

As the adhesive agent is discharged during the process of mounting, the adhesive agent may be actively distributed (e.g. by some kind of smearing process) along the inner and outer surfaces of the penetrating insert as well as the surrounding core structure. This leads to large-area bonding interfaces between the insert and the surrounding core structure, as well as to local mechanical augmentation of the core structure by adhesive agent bonded to the solid parts of the core structure, leading to an insert system with a particularly high mechanical load-carrying capability.

Within the context of the invention, "panel" should be understood as to include any type of panel, such as e.g. essentially flat plates, curved shells, box structures etc. The panel may also comprise a second cover sheet that covers at least part of the core structure, forming a kind of sandwich panel. The core structure may be a cellular solid, such as a honeycomb structure and/or a closed-cell foam and/or an open-cell foam. The core structure may comprise a particleboard. The core structure may e.g. be made from a plastic material and/or a fiber reinforced plastics and/or a metal and/or an organic material (e.g. cellulose). The first and/or the second cover sheet may comprise e.g. a sheet made from a plastic material or a fiber reinforced plastic or a metal, such as e.g. steel or aluminum or titanium and their alloys. Alternatively or in addition, the cover sheet may comprise a veneer, such as a stone veneer and/or a wood veneer and/or a bamboo veneer and/or a surface coating (e.g. a coat of lacquer and/or a metal coating). The core structure and/or the first and/or the second cover sheet may comprise multiple layers made from different types of solids with respect to material and/or micro- or macrostructure. For some types of core structures, e.g. for core structures that do not comprise cavities with a minimum size to receive a certain amount of adhesive agent, one or multiple cavities to receive an adhesive agent may be created and/or modified in the core structure. Thus, the load carrying capability may be increased.

The insert and/or the outer skirt may have a circular shape. However, the invention is not limited to inserts with circular, respectively rotational symmetric shapes. Hence, also inserts, respectively outer skirts, with other shapes, such as elliptical or angular (e.g. triangular, rectangular, hexagonal) shapes are possible.

The insert system according to the invention is not limited to a certain type of adhesive agent. However, particularly good results may be obtained using curing adhesives, such as chemically curing adhesives and/or light/UV curing adhesives. For some applications, the adhesive agent may have thixotropic properties, which may reduce the risk of polluting the panel due to glue dripping out of the chamber. In order to establish a particularly good electrical interconnection between the insert and the panel, which may be desired e.g. in order to obtain potential equalization and/or grounding of the panel, an adhesive agent with a high electrical conductivity may be applied.

Good results are achieved if the piston is offset from the first outer panel surface in vertical direction by an offset distance. Within the context of the present invention, the term "vertical direction" should be understood as being essentially perpendicular to a horizontal plane defined by the first outer panel surface at the region of the opening. The piston may be part of the panel and/or may be part of a corresponding insert member arranged prior to or together with the above-mentioned insert in the panel. Hence, an insert for an insert system according to the present invention may also comprise multiple members that can be pushed into one another in an axial direction. Multiple pistons may be foreseen.

In a variation, the opening comprises a trench in the core structure that surrounds the piston, as will be explained in more detail below. For some applications, the outer skirt may comprise an outer skirt end that is arranged such that it interlocks with the trench (respectively the walls of the trench) when the piston sweeps into the chamber, and thereby temporarily positions the insert with respect to the panel without additional aid until the adhesive agent is cured. Hence, depending on the application, e.g. undesired tilting of the insert during insertion can be avoided. The outer skirt end may also serve as an anchoring means, what will be explained in more detail below.

For some purposes, the insert may comprise an inner skirt that extends from the base and which is arranged in the chamber and spaced a distance apart from the outer skirt. The inner skirt may be a hollow cylinder, as will be shown in detail below. However, it may also be a solid body like a stud. Various types of cross-sections are feasible; hence, the present invention is not limited to circular inner skirts. The inner skirt may e.g. increase insert stability and/or assist mounting of the insert, as will be explained in more detail below. The inner skirt may also protrude from the chamber. For some applications, the inner skirt may be closed at a free inner skirt end, as will be shown herein further below. However, the inner skirt end may also be open and e.g. form a channel that interconnects an opening in the first cover sheet on a top face of a panel with an opening in a second cover sheet on a bottom face of a panel.

In the presence of an inner skirt, the piston comprises at least one recess arranged to receive the inner skirt. Thus, for some applications, insert stability may be increased, as well as positioning/alignment of the insert with respect to the panel may be improved, as will also be explained further below.

In order to facilitate mounting of the insert, the free outer skirt end and/or the free inner skirt end may comprise at least one guiding means that facilitates insertion of the insert into the opening. As will be shown further below, the guiding means may e.g. comprise a chamfer that assists in aligning the insert with the opening and hence to correct small deviations in the positioning of the insert relatively to the opening. The guiding means may also be arranged in the chamber, in particular they may be arranged at the first inner skirt surface or (if an inner skirt is present) at the outer surface of the inner skirt. A guiding means may also comprise a grooving or ridge.

The inner skirt and/or the outer skirt may comprise or act themselves as an anchoring means that at least temporarily interacts with the core structure and/or the first cover sheet and/or the second cover sheet to restrict unwanted movements and/or rotations of the insert with respect to the panel during curing of the adhesive agent. Such anchoring means may comprise a local increase in the thickness of the first and/or the second skirt, such as e.g. a protrusion and/or a barb-like means and/or knurls. Alternatively or in addition, the anchoring means may also comprise a fine thread on the first outer skirt surface.

Good distribution of adhesive agent in the peri-insert core structure can be obtained if at least one passage arranged in the outer skirt interconnects the first inner skirt surface with the first outer skirt surface forming a first pathway to discharge at least part of the adhesive agent to the outside of the insert into the core structure. Thus, adhesive agent can be discharged in a controlled manner to the peri-insert core structure also in a lateral direction with respect to the axis of insertion of the insert, as will be shown in more detail below.

Depending on the type of cellular solid, in particular its material, alignment and shape of the cells, the insert may comprise multiple passages arranged circumferentially distributed around the outer skirt. Thus, a particularly even distribution of adhesive agent in the surrounding core structure may be obtained.

Alternatively or in addition, between the first inner skirt surface and the piston a gap may be foreseen, forming a second pathway to discharge at least part of the adhesive agent into the core structure, as will be explained in more detail below. Hence, adhesive agent can efficiently be discharged in regions of the core structure not optimally covered by e.g. the first flow path.

Good results may be obtained if a protrusion arranged in the second pathway protrudes from the first inner skirt surface such that it at least temporarily constricts the gap when the piston sweeps along the protrusion and thereby limits discharge of adhesive agent via the second pathway. For some applications, the gap may at least temporarily be constricted to an extent where at least a part of the protrusion touches the piston, hence where the gap is essentially equal to zero. Such variations of the invention may e.g. be advantageous if adhesive agents with a very low viscosity are used. A protrusion may also serve as an anchoring means.

Alternatively or in addition, between an inner skirt of the insert and the recess in the piston, a third pathway to discharge at least part of the adhesive agent to the outside of the insert into the core structure may be formed by a gap defined between the inner skirt and the boundary of the recess. Good results may be obtained if a second protrusion arranged in the third pathway protrudes from the outer surface of the inner skirt such that it at least temporarily constricts the gap when the piston sweeps along the second protrusion and thereby limits discharge of adhesive agent via the third pathway. A protrusion may also serve as an anchoring means.

In order to obtain a preferred distribution via the passage at least during initial insertion of the insert, the at least one passage may be arranged between the protrusion and the base. Hence, the pathways via which adhesive agent is discharged can be altered during the process of mounting of the insert, as will be explained in further detail below. Thus, at the beginning of the mounting process of an insert a certain minimum amount of adhesive agent may be deposited in the core structure and adjacent to the first cover sheet. It turned out that adhesive agent present at this location significantly increases the mechanical load-carrying capability of inserts, as it supports load transfer from the insert to the first cover sheet. As well, part of the adhesive agent discharged to the core structure adjacent to the first cover sheet will typically stick to the first outer skirt surface and therefore be taken along with the insert during the mounting process. This effects some kind of distribution process, which causes a large-area adhesive contact between insert and the surrounding core structure, as well as some mechanical augmentation of the surrounding core structure, e.g. the cells' walls if it is a cellular solid.

Alternatively or in addition, depending on the cross-section of the insert, the insert may also be rotated around the vertical axis during insertion in order to influence the distribution of adhesive agent in peri-insert core structure.

In order to deposit a particularly high amount of adhesive agent in the core structure adjacent to the first cover sheet, the at least one passage may be arranged immediately adjacent to the protrusion, as will be shown in more detail below.

Distribution of adhesive agent from the chamber into the surrounding core structure can e.g. be done via the first pathway or the second pathway or a third pathway or any other pathway or combinations of two or multiple pathways.

In order to obtain initial insert strength after mounting of the insert and prior to curing/hardening of an adhesive agent, in a mounted state a force-fit and/or form-fit may be established between the first outer skirt surface and at least part of the first cover sheet and/or the core structure, restricting displacements and rotations of the insert with respect to the first cover sheet (respectively the core structure). Alternatively, or in addition the insert may comprise a collar that interacts with the first cover sheet in order to provide a minimum initial insert stability.

Depending on the type of insert and panel used, the piston may be at least partially made from a part of the first cover sheet and/or a part of the core structure of the panel, as will be explained in more detail below. Thus, particularly economic insert systems can be obtained.

Alternatively or in addition, the piston may be at least partially made from an insert. This insert may be a member of a multi-part insert or may be a separate insert that is mounted in the opening of the panel. Such types of inserts are advantageous for certain applications and certain types of panels.

Another object of the present invention is to provide an insert for an insert system according to any of the preceding claims. Such an insert may comprise at least one connection means to establish a mechanical and/or electrical interconnection with e.g. an equipment means. Alternatively or in addition, the insert may comprise a magnet to establish a magnetic interconnection with e.g. an equipment means and/or may comprise a means (e.g. a ferromagnetic portion) to establish a magnetic interconnection with a magnet.

The inserts may be made using an injection molding process, which allows particularly economic production of the insert. The inserts may e.g. be made from a metal, such as steel, aluminum, magnesium, titanium and their alloys. Alternatively, the inserts may at least partially be made from a plastic or a fiber reinforced plastic, such as e.g. a short fibers reinforced plastic. The inserts may also be made from wood or stone.

The inserts may be a hybrid component, made from a combination of multiple materials. For some applications, a particularly cost-effective insert may be obtained if parts of the insert configured for load transfer are at least partially made from a material with a high mechanical strength (e.g. a metal or a fiber reinforced plastic) whereas parts of the insert responsible mainly for the distribution of adhesive agent are at least partially made from a plastic (e.g. formed by an insert molding process).

For some applications, at least some faces of the insert may comprise a surface coating that facilitates insertion of the insert into an opening (e.g. by decreasing friction with the surrounding panel) and/or increases bonding between the insert and an adhesive agent. Alternatively or in addition, at least some faces of the insert may comprise a surface coating/plating that influences the chemical properties and/or physical properties and/or tactile properties and/or visual appearance of the corresponding surface. As such, the surface which is visible when the insert is in a mounted state may comprise a stone veneer and/or a wood veneer and/or a bamboo veneer and/or a coat of lacquer and/or a metal coating—such as gold).

For some purposes, an insert may comprise a first insert member having a base and an outer skirt extending from the base, thereby forming a chamber to receive an adhesive agent, said outer skirt being provided with a first inner skirt surface and a first outer skirt surface, as well as a second insert member comprising a piston to be inserted in the chamber. Thus, for certain applications and/or types of panels, discharge of adhesive agent into the peri-insert region of the panel can be efficiently controlled.

For some applications, the first insert member may comprise a projection configured to seal at least partially a port arranged in a second cover sheet arranged on the bottom side of the panel when the first insert member is in a mounted state.

In order to obtain good distribution of adhesive agent in the peri-insert core structure at least one passage may be arranged at the outer skirt of the first insert member, interconnecting the first inner skirt surface with the first outer skirt surface forming a first pathway to discharge part of an adhesive agent arranged in the chamber to the outside of the insert. The first insert member may comprise multiple passages arranged circumferentially distributed around the outer skirt. In some embodiments of such an insert, the second insert member may be pushed at least partially into the first insert member in an axial direction, as will be shown in more detail. Thus, a relatively compact insert can be obtained that allows to obtain an insert system with a particularly high load carrying capability, which may be advantageous for some applications. Depending on the application, to facilitate insertion of the insert into the opening, at least one guiding means may be arranged at the first insert member.

In order to facilitate the mounting process, the first and the second insert member may be mechanically interconnected prior to the insertion into the opening. Alternatively, the first and the second insert member may be inserted into the opening independently from each other. The first and the second insert member may be mechanically interconnected, e.g. by means of a thread and/or a ratcheting mechanism and/or adhesive agent. In particular, the second insert member may be screwed into (respectively onto) the first insert member. The mechanical interconnection may e.g. be established during mounting of the insert and, if desired, be at least augmented by the adhesive agent.

For some applications, the first and the second insert member may be interconnected prior to mounting, encapsulating an amount of adhesive agent. Thus, insert systems can be produced without the need of an adhesive dispenser.

An insert system comprising an insert having a first and a second insert member as described above may be produced using a method comprising the method steps of providing a panel having a core structure and a first cover sheet defining a first outer panel surface and the method step of providing an insert as described herein. In a further method step, a first opening is induced into the first cover sheet to receive at least part of the insert. In a further method step, the first and the second insert member are inserted into the opening, whereby a piston sweeps into the chamber and thereby discharges at least part of an adhesive agent from the chamber via at least one pathway. For some applications, the second insert member may be inserted into the opening before the first insert member is inserted into the opening. For other applications, the second insert member may be inserted into the opening after the first insert member is inserted into the opening.

For some applications, a port may be induced into a second cover sheet of the panel (if present). Thus, an insert system extending through the whole panel may be obtained, as described in more detail below. Good results may be obtained if the port differs in area and/or shape from the opening. Thus, accurate positioning of the insert can be achieved for some types of insert systems.

Another embodiment of a method for producing an insert system according to the present invention comprises the method steps of providing a panel having a core structure and a first cover sheet defining a first outer panel surface, as well as providing an insert having a base and an outer skirt extending from the base, thereby forming a chamber, said outer skirt being provided with a first inner skirt surface and a first outer skirt surface. In a further method step, an opening is induced into the panel to receive at least part of the insert. In a further method step the insert is inserted into the opening, whereby a piston that is arranged in the opening and beneath the first outer panel surface sweeps into the chamber and thereby discharges at least part of an adhesive agent from the chamber via at least one pathway. The piston may be offset from the first outer panel surface in vertical direction by an offset distance when discharging of at least part of the adhesive agent from the chamber via at least one pathway starts.

The method may also comprise the method step of inducing a trench into the core structure that surrounds the piston. Thus for some types of inserts and panels, insert systems with a particularly high load carrying capability can be obtained. The trench may have a depth and/or a width that is/are chosen such that an outer skirt end arranged at the outer skirt interlocks with the trench when the piston sweeps into the chamber and thereby at least temporarily positions the insert with respect to the panel. The opening may be induced using a drilling process and/or a milling process (e.g. an ultrasound milling process) and/or a sawing process and/or a laser cutting process.

For some applications, the trench may at least partially have a depth that is smaller than the height of the outer skirt. Thus, when mounting the insert into the opening, a reaction force is generated that counteracts the insertion of the insert. It was found that thus, for certain types of panels and/or inserts the precision of positioning of the insert with respect to the panel can be improved. Alternatively, the trench may have a depth that is equal or higher than the height of the outer skirt. Thus, a gentle mounting of the insert becomes possible, which may be advantageous e.g. if the panel has relatively sensitive cover sheets or core structure.

During the method step of inserting the insert into the opening, the insert may be at least temporarily guided by at least one guiding means arranged at the outer skirt end and/or the inner skirt end of the insert (respectively of the first insert member).

During and/or after the method step of inserting the insert into the opening, anchoring means arranged at the inner skirt and/or at the outer skirt of the insert (respectively the first insert member) may at least temporarily interact with the core structure and/or the first cover sheet and/or a second cover sheet (if present) in order to restrict movements and/or rotations of the insert with respect to the panel.

In a variation of the invention, during and/or after the method step of inserting the insert into the opening, at least part of the adhesive agent is discharged via a first pathway formed by at least one passage arranged at the outer skirt of the insert (respectively the first insert member), said at least one passage interconnecting the first inner skirt surface with the first outer skirt surface. Alternatively or in addition, at least temporarily during the method step of inserting the insert into the opening at least part of the adhesive agent may be discharged into the opening via a second pathway formed by a gap defined between the piston and the outer skirt. In one variation of the invention, during the method step of inserting the insert into the opening, discharge of adhesive agent via the second pathway may at least temporarily be limited by means of the gap being constricted at least temporarily when the piston sweeps along a protrusion arranged in the second pathway and protruding from the first inner skirt surface.

A variation of a method according to the invention comprises the method step of applying an amount of adhesive agent to the opening prior to the step of inserting the insert into the opening. Alternatively or in addition, the method may comprise the method step of applying an amount of adhesive agent to the chamber. Good distribution of adhesive agent in the chamber may be obtained if the insert and an outlet of an adhesive dispenser rotate relatively to each other when adhesive agent is applied, e.g. by rotating the insert around a central axis and/or revolving it about an axis offset and parallel to the central axis. In a variation of the invention, a first component of a two-component curing adhesive is applied to the chamber and a second component of the two-component adhesive is applied to the opening. Due to the special geometry of the insert according to the present invention, good mixing of the components and hence fast curing of the adhesive agent can be obtained.

In order to obtain an insert system with a high and reproducible structural integrity, a variation of a method for producing an insert system comprises the method step of determining the amount of adhesive agent applied to the chamber by means of optical inspection and/or by means of weighing of the insert. If the amount of adhesive agent lies in a range of specified values, the insert may subsequently be inserted in the opening. If it differs from the range of specified values, in a subsequent step the insert may be excluded from being inserted, respectively adhesive agent may be added or removed from the chamber.

A variation of a method according to the invention comprises the method step of removing at least a part of the first cover sheet such that a piston part of the first cover sheet is at least partially disconnected from the rest of the first cover sheet, whereby the piston part is interconnected to the core structure. Subsequently, the piston part may be displaced beneath the first outer panel surface. The piston part after being at least partially disconnected from the rest of the cover sheet may be displaced in vertical direction beneath the first outer panel surface. Good results may be obtained if it is displaced by a distance greater than the offset distance. Thus, elastic behavior of the core structure and/or the cover sheet can be accounted for. The piston part may be at least temporarily be guided by an indenter when being displaced in vertical direction. During displacement of the piston part, the indenter may be at least temporarily mechanically interconnected with the piston part. Therefore, the indenter may comprise e.g. a clamping mechanism or a vacuum mechanism to establish a mechanical interconnection with the piston. By such a mechanical interconnection, drifting and/or tilting of the piston can be prevented, which may be advantageous for certain special types of core structures.

In a variation of a method according to the invention, during insertion of the insert into the opening, the insert is at least temporarily interconnected with an insertion tool (insertion head). Good results may be obtained if the insertion tool supports the insert such that it can move relatively freely in directions perpendicular to the direction of insertion. Therefore, the insert may be interconnected to the insertion tool e.g. by means of mechanical clamping and/or by magnetic force and/or a vacuum system, as will be shown in further detail below.

In order to ensure proper positioning of the insert, a variation of a method according to the present invention comprises the method step of initially inserting the insert by a first distance into the opening and a subsequent method step during which the position of the insert relatively to the panel is determined. Good results may be obtained if the distance between an outer surface of the base relatively to the first outer panel surface is determined. Therefore, e.g. an optical sensor and/or an ultrasound sensor and/or a tactile sensor may be used. If the position of the piston relatively to the panel differs from a predefined position, the first distance may be adjusted, after which the insert may displaced by the adjusted first distance and subsequently the position may be determined again. This sequence may be repeated until the predefined position (target position) of the insert with respect to the panel is obtained.

For some types of inserts and/or panels the insert may at least temporarily be displaced into the panel to a larger extent than the target position, e.g. beneath the first outer panel surface, in order to compensate for elastic behavior of the insert and/or the panel, as will be explained in more detail below.

A variation of a method according to the invention comprises the method step of detecting and/or storing a marker arranged at the insert by means of an electronic system. Good results may be obtained if a marker is arranged at an outer surface of the insert to facilitate identification of insert type and/or insert position and/or insert alignment and/or to uniquely identify an insert. The marker may be arranged on an outer surface of the base. A marker may be present before an insert is mounted. Alternatively or in addition, a marker may be applied to an insert during or after mounting of the insert. Therefore, e.g. a laser or an inkjet system may be used. For some applications, the insert may also comprise a sheet and/or foil arranged on an outer surface of the insert, which may be peelable, hence may be removed from the insert without leaving any residues. Such a sheet and/or foil may be used in order to facilitate identification of an insert (respectively a specific attachment point of a panel assembly), e.g. by comprising a marker as mentioned above and/or being configured to receive such a marker. Alternatively or in addition such a sheet and/or foil may facilitate mounting of the insert, e.g. by at least temporarily sealing openings in the insert and thereby making handling of the insert by means of vacuum systems possible, as will be explained in more detail below.

The present invention is also directed to a device for producing an insert system as described above, respectively a device to perform a method to produce an insert system as described above. Good results may be obtained if the device comprises a holding device for holding a panel, and a processing head displaceable with respect to the panel and configured to receive an opening tool to induce an opening into the panel at a predefined position. The device typically further comprises an insertion tool displaceable with respect to the panel and configured to support/guide an insert to be inserted in the opening. Good results may be obtained if the insertion tool comprises a connecting part configured to interconnect with the insert, whereby the connecting part has a smaller dimension than the insert in a plane transversal to the direction of mounting of the insert. Thus, collisions between the insertion tool and the first cover sheet can be prevented if the insert is displaced beneath the first outer surface, which according to the present invention may be applied in order to compensate for spring-back of the insert after the insertion tool is removed, due to elastic behavior of the panel and/or the insert. The dimensions of the connecting part of the insertion tool may be chosen such that also displacements of the insert relatively to the insertion tool, caused by self-alignment of the insert during mounting will not result in a collision between the insertion tool and the first cover sheet. This will be explained in more detail below. In order to obtain a highly automated production of insert systems, the device may comprise an insert dispenser for dispensing of inserts to be inserted in the panel. The insert dispenser may comprise a storage in order to store large amounts of inserts. In order to store high number of inserts and/or for certain special types of inserts, the insert dispenser may comprise a bowl feeder to store the inserts and orient them in a particular direction. Alternatively or in addition, the inserts may be stored, respectively be provided oriented and aligned in one or multiple magazines. As well, an insert dispenser will typically comprise a discharge point where inserts are provided e.g. to a handling device. For certain applications, an insert dispenser may comprise multiple sub-dispensers for dispensing of multiple different types of inserts. As well, the device may comprise an adhesive dispenser for dispensing of adhesive agent. Good results may be obtained if the adhesive dispenser is positioned spatially separated from the holding device, in particular such that it is not vertically above a panel held by the holding device. Thus, pollution of the panel by adhesive agent dripping from the dispenser can be prevented. However, for some applications and/or types of adhesives, the adhesive dispenser may be arranged vertically above the panel and/or at (or adjacent to) the processing head.

For some applications, the holding device may comprise a table, which may comprise at least one intake/aspiration port in order to establish a mechanical interconnection with the panel to be held by means of a vacuum.

In a variation of the device, the processing head may comprise at least one tool head to receive an opening tool and/or an indenter and/or a detector and/or an insertion tool, as will be described in more detail below.

The present invention is also directed to a panel assembly, which comprises at least one insert system according to the invention as described herein.

BRIEF DESCRIPTION OF SEVERAL VIEWS OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

The foregoing summary, as well as the following detailed description of the preferred embodiments, is better understood when read in conjunction with the appended drawings. For the purpose of illustrating the invention, an embodiment that is presently preferred, in which like numerals represent similar parts throughout the several views of the drawings, it being understood, however, that the invention is not limited to the specific methods and instrumentalities disclosed.

Figure 1:
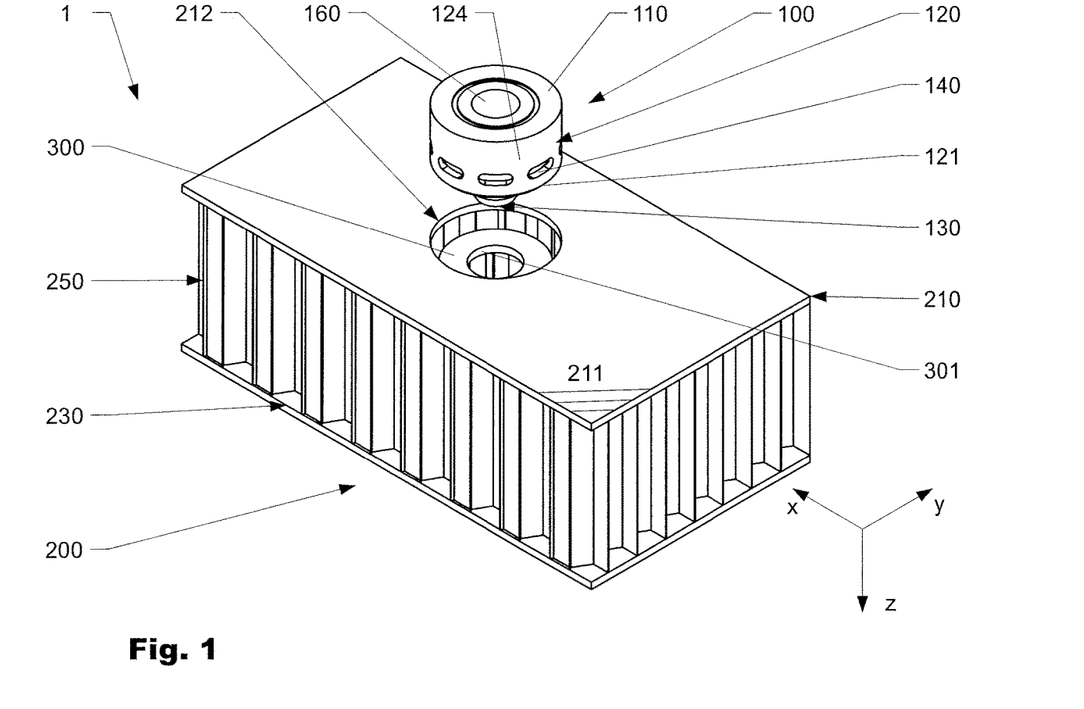
FIG. 1 schematically shows an embodiment of an insert system according to the invention, the insert being outside of the opening, in a perspective view from above.

FIG. 1 shows an embodiment of an insert system 1 according to the present invention prior to mounting of the insert 100. The insert comprises a base 110 and an outer skirt 120 that extends from the base 110 to an outer skirt end 121. The base 110 and outer skirt 120 form a chamber (not visible) as will be shown e.g. in subsequent FIG. 3. The insert 100 comprises multiple passages 140 arranged circumferentially distributed around the outer skirt 120 and which interconnect a first inner surface (not visible) of the outer skirt 120 with a first outer surface 124 of the outer skirt 120. The insert further comprises a connection means 160 which is an inner thread to receive e.g. a screw (not shown) in order to mechanically interconnect e.g. an equipment device with the insert 100.

Figure 2:
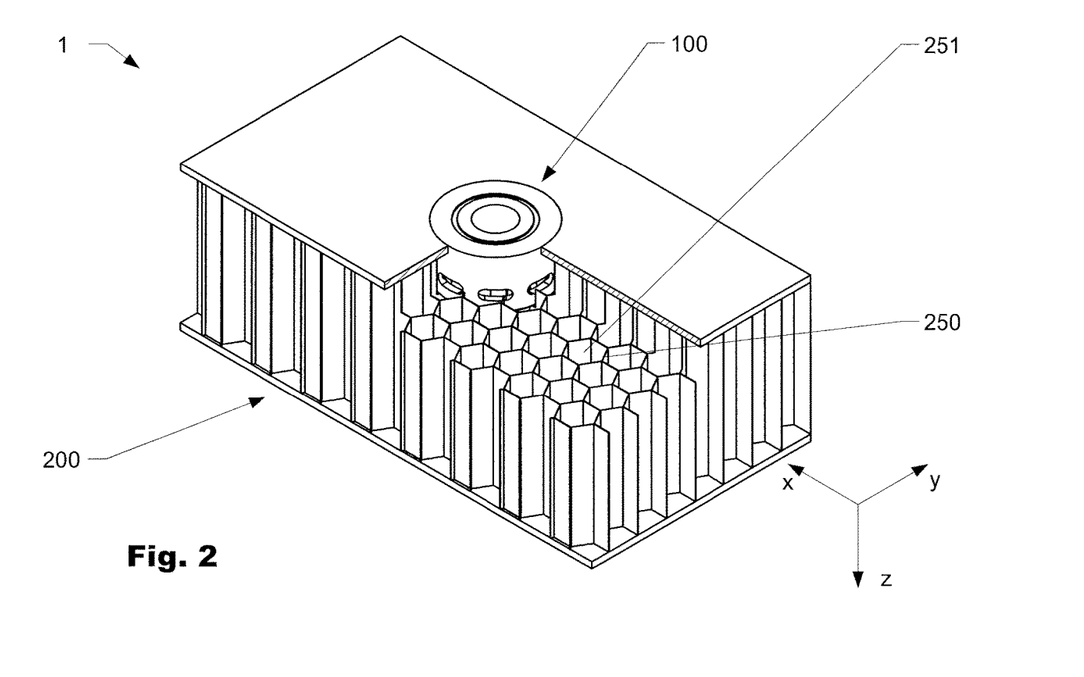
FIG. 2 schematically illustrated the insert system of FIG. 1 being in a mounted state with part of the first cover sheet and the core structure being clipped for illustrative purposes in a perspective view from above.

The insert system 1 further comprises a panel 200, which comprises a core structure 250. The core structure 250 of the embodiment shown is a honeycomb structure comprising a plurality of cells 251 (as shown in FIG. 2) delimited by cell walls 252. The panel 200 further comprises a first cover sheet 210 and a second cover sheet 230 that cover the core structure 250. The first cover sheet 210 defines a first outer panel surface 211 and has an opening 212 in which a piston 300 is arranged, beneath the first outer panel surface 211. The piston 300 has a recess 301 suited to receive an inner skirt 130 of the insert 100 when the insert is being mounted.

FIG. 2 shows the insert system 1 of FIG. 1, the insert 100 being in a mounted state. For illustrative purposes, no adhesive agent is shown in FIG. 1 and FIG. 2. As shown in FIG. 2, the multiple passages 140 are fluidically interconnected with the adjacent cells 251 of the core structure 250.

FIG. 3 to FIG. 7 schematically illustrate the insert system 1 during mounting of an insert 100.

Figure 3:
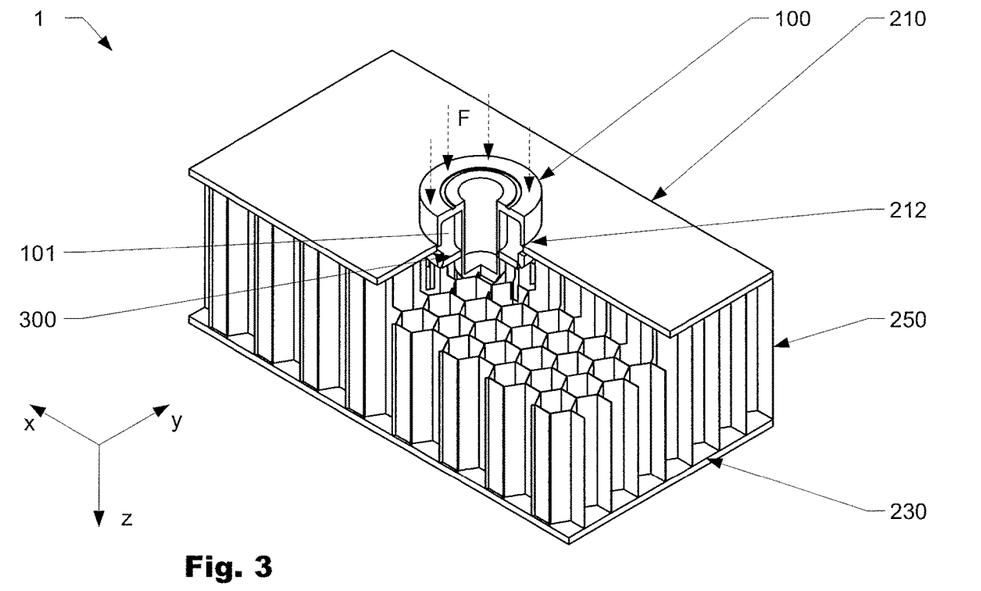
FIG. 3 schematically shows the insert system of FIG. 1 during mounting of the insert, the insert being partially clipped for illustrative purposes, in a perspective view from above.
Figure 4:
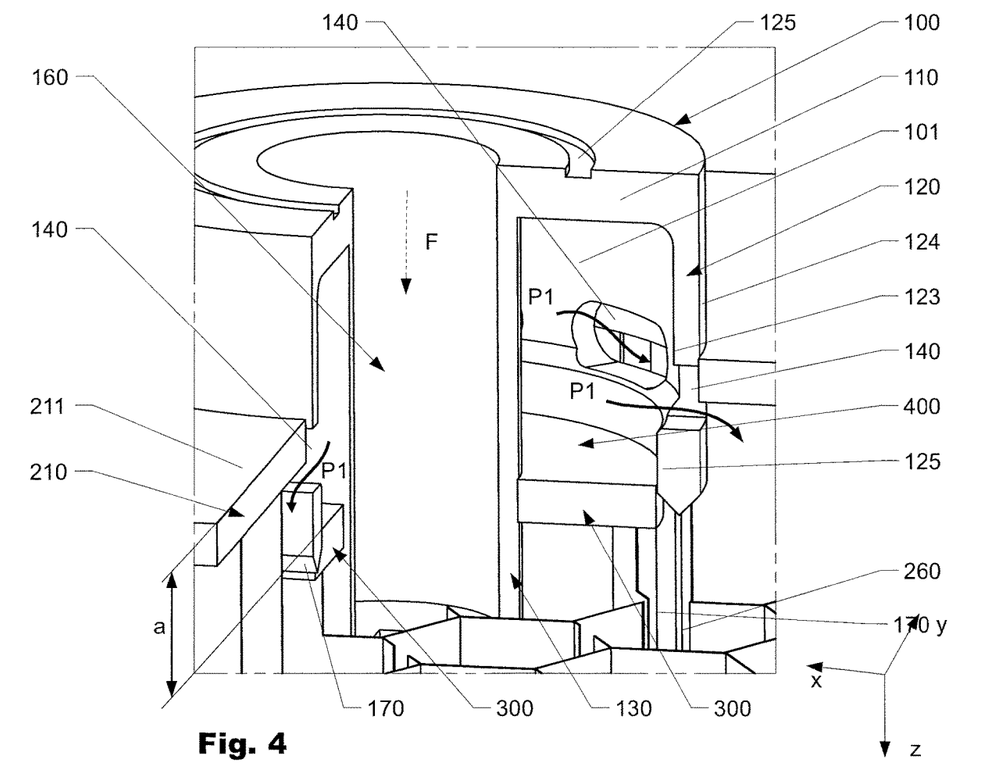
FIG. 4 schematically shows the interfacial region between the insert and the panel of FIG. 3, in a slightly altered perspective view.

FIG. 3 and FIG. 4 illustrate an insert system 1 at the beginning of a mounting process, where the insert 100 just has slightly entered into the opening 212 in the first cover sheet 210 and is moved further into the opening 212 by an insertion force F. As shown in FIG. 4, the insert 100 comprises a chamber 101 formed by the base 110 and the outer skirt 120. In the chamber 101, an inner skirt 130 is arranged that extends from the base 110 and is spaced a distance apart from the outer skirt 120. Hence, in the embodiment of an insert 100 shown, the chamber has a toroidal shape. On its inside, the inner skirt 130 comprises a bore with a thread 160 in order to establish a mechanical interconnection as described above. Inside of the chamber 101, an adhesive agent 400 is arranged, which for illustrative purposes, herein is not shown as a solid body. As shown in FIG. 4, the embodiment of an insert 100 comprises guiding means 170, which are formed as chamfers that facilitate penetration of the insert 100 into the opening 212 by inter alia assisting in aligning the insert 100 with respect to the opening 212 and hence correcting minor deviations in the positioning of the insert 100 relatively to the opening 212. The opening 212 comprises a trench 260 in the core structure 250 that surrounds the piston 300 and is configured to receive the outer skirt 120.

As illustrated in FIG. 4, the outer skirt 121 and the opening 212 are dimensioned such that the first outer skirt surface 123 is in close contact with the first cover sheet 210 when the insert 100 is arranged in the opening 212. A protrusion 125 protrudes at the outer skirt end 121 from the first inner skirt surface 123 such that there is only a small clearance (not visible in the Figure) between the piston 300 and the outer skirt 120 when the piston 300 sweeps along the protrusion 125, as illustrated in FIG. 4. The passages 140 are arranged at the outer skirt 120 between the protrusion 125 and the base 110, adjacent to the protrusion 125. The piston 300 is offset from the first outer panel surface 211 in vertical direction z by an offset distance a, leading to an aperture between the piston 300 and the first cover sheet 210. As illustrated in FIG. 4, the passages 140 and the protrusion 125 are dimensioned and positioned such that the passages 140 are arranged beneath the first outer panel surface 211 as soon as the piston 300 sweeps along the protrusion 125. Hence, the passages 140 form a first pathway P1 to discharge part of the adhesive agent 400 to the outside of the insert 100 into the core structure 250, as schematically illustrated by the arrows. The adhesive agent 400 is discharged as the moving piston 300 reduces the volume in the chamber 101. Hence, part of the adhesive agent 400 is first mainly deposited in the core structure 250 adjacent to the first cover sheet 210. A minor amount of adhesive agent 400 may also be discharged via the small clearance between the piston 300 and the protrusion 125, as well as a small clearance between the piston 300 and the inner skirt 130. However, as the passages 140 in comparison have relatively large cross-sections, in the embodiment shown the first pathway P1 is predominant for the discharge of adhesive agent 400 as long as the piston 300 sweeps along the protrusion 125. A portion of the adhesive agent 400 that has been deposited in the core structure 250 during said initial step of mounting will typically also stick to the first outer skirt surface 124. Hence, when the insert 100 further penetrates into the opening 212, a portion of the adhesive agent 400 will also be taken along with the insert 100 into the panel 200. This effects some kind of distribution process that causes a large-area adhesive contact between the insert 100 and the surrounding core structure 250.

As also shown e.g. in FIG. 4, the insert 100 may also comprise at least one marker 125 that may e.g. be arranged on an outer surface of the base 110. Such a marker 125 may e.g. be used in order to identify the type of insert and/or orientation of the insert by e.g. optical means. In the embodiment shown, the marker 125 is formed as an annular notch. A marker 125 may also facilitate controlling of the positioning of an insert 100 after insertion and/or may be used in order to identify a specific insert 100 (respectively attachment point) after insertion. A marker 125 may also comprise e.g. a printed character and/or a symbol and/or a barcode (1d or 2d) applied directly on an outer surface of the insert 100 and/or applied to e.g. a peelable sheet or film that is applied to the insert 100, as described above.

Figure 5:
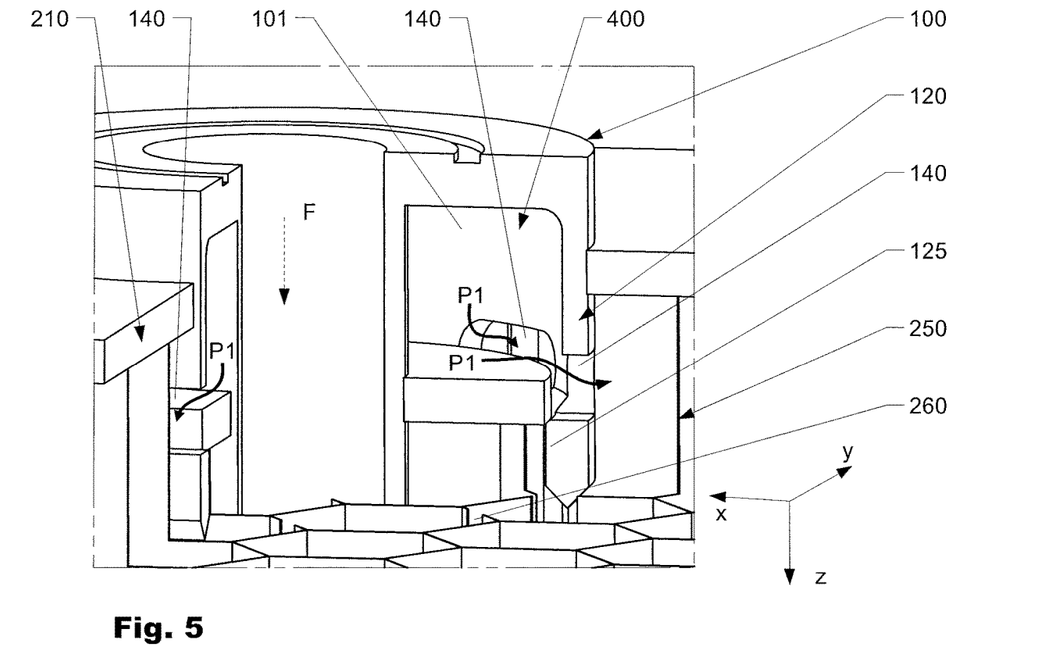
FIG. 5 schematically shows the interfacial region between the insert and the panel of FIG. 4 at a subsequent time step during mounting of the insert, in a slightly altered perspective view.
Figure 6:
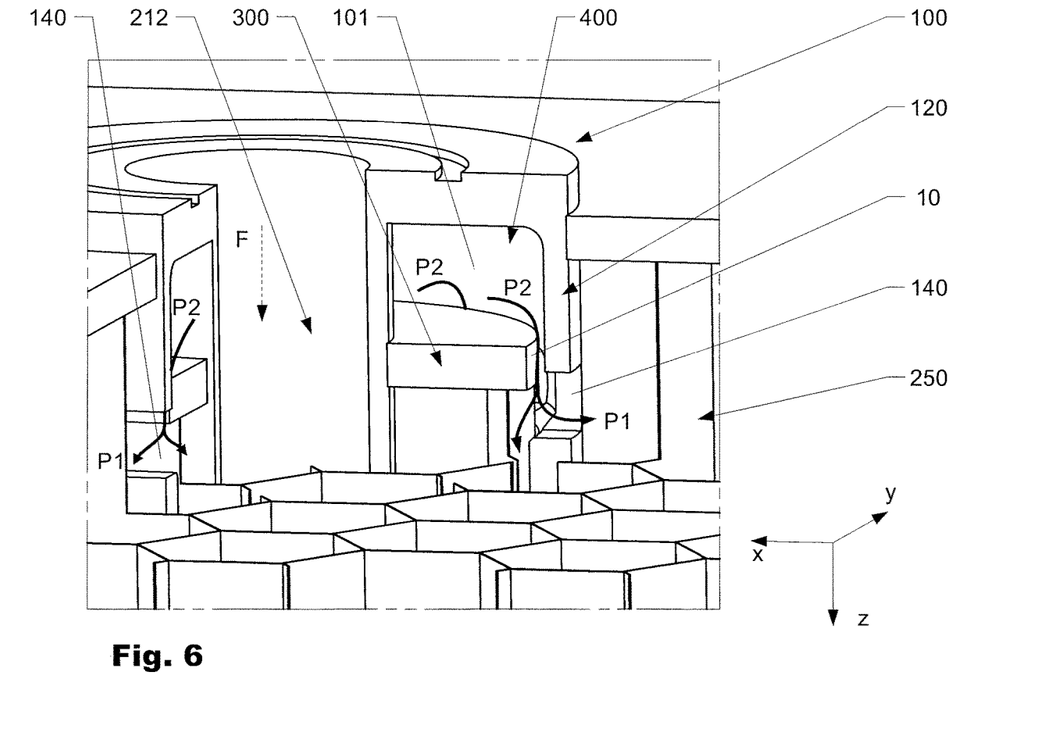
FIG. 6 schematically shows the interfacial region between the insert and the panel of FIG. 5 at a subsequent time step during mounting of the insert, in a slightly altered perspective view.

FIG. 5 and FIG. 6 illustrate the insert system 1 when the piston 300 sweeps beyond the protrusion 125. As shown in FIG. 6, a gap 10 is defined between the piston 300 and the outer skirt 120, forming a second pathway P2 to discharge part of the adhesive agent 400 into the core structure 250. Hence, adhesive agent 400 is also discharged in vertical direction z along the insert 100. As indicated by the arrows, part of the adhesive agent 400 discharged via the second pathway P2 may subsequently flow via the first pathway P1 to the outside of the insert 100 into the peri-insert core structure 250, whereas part of the adhesive agent 400 is discharged into the part of the core structure 250 beneath the opening 212.

Figure 7:
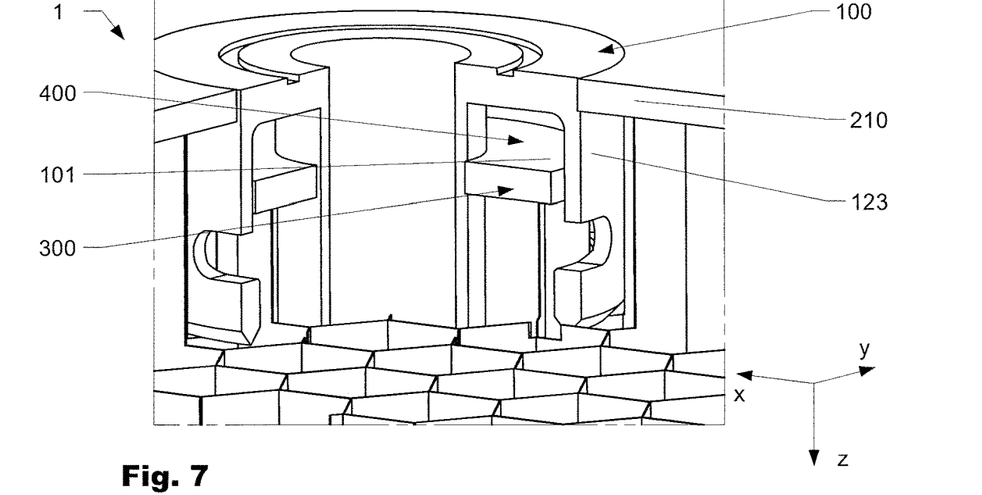
FIG. 7 schematically shows the interfacial region between the insert and the panel of FIG. 4 to FIG. 6, the insert being in a mounted state, in a perspective view from above.

FIG. 7 shows the insert system 1 of FIG. 1 to FIG. 6 after mounting of the insert 100. In order to provide initial insert strength before the adhesive agent has fully hardened/cured, a force-fit is established between the first outer skirt surface 123 and at least part of the first cover sheet 210, which restricts displacements and rotations of the insert 100 with respect to the first cover sheet 210.

Figure 8:
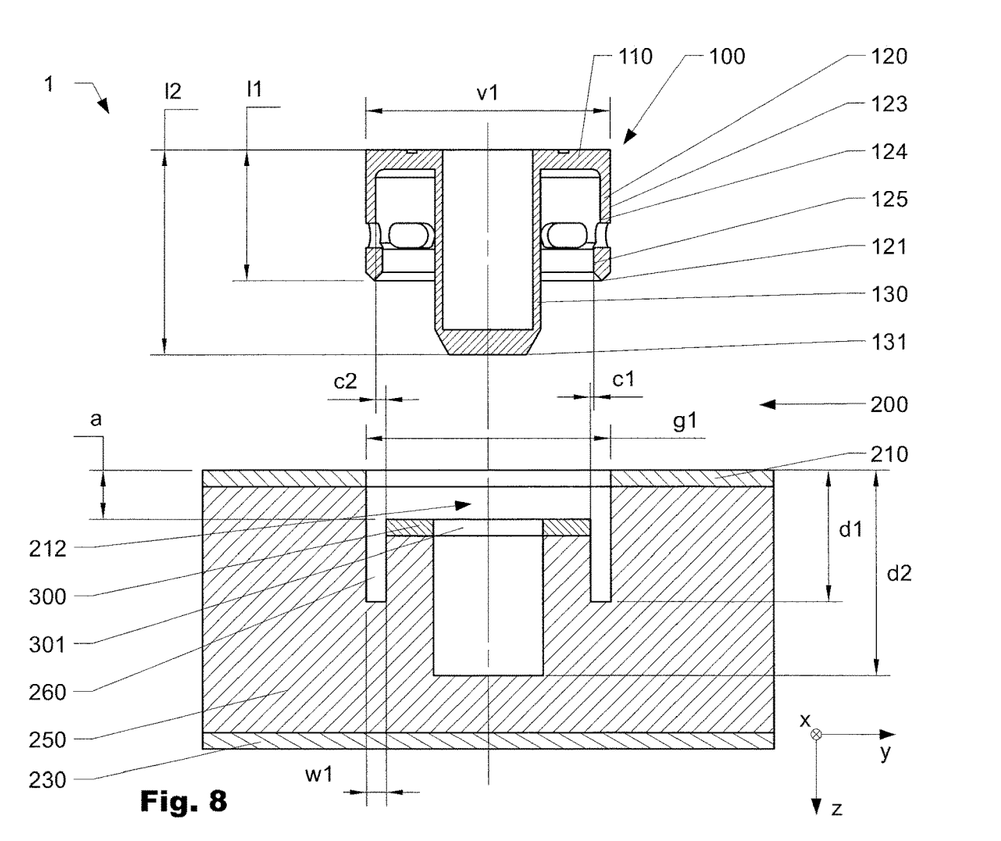
FIG. 8 schematically shows a cross section of an embodiment of an insert system prior to mounting of the insert.
Figure 9:
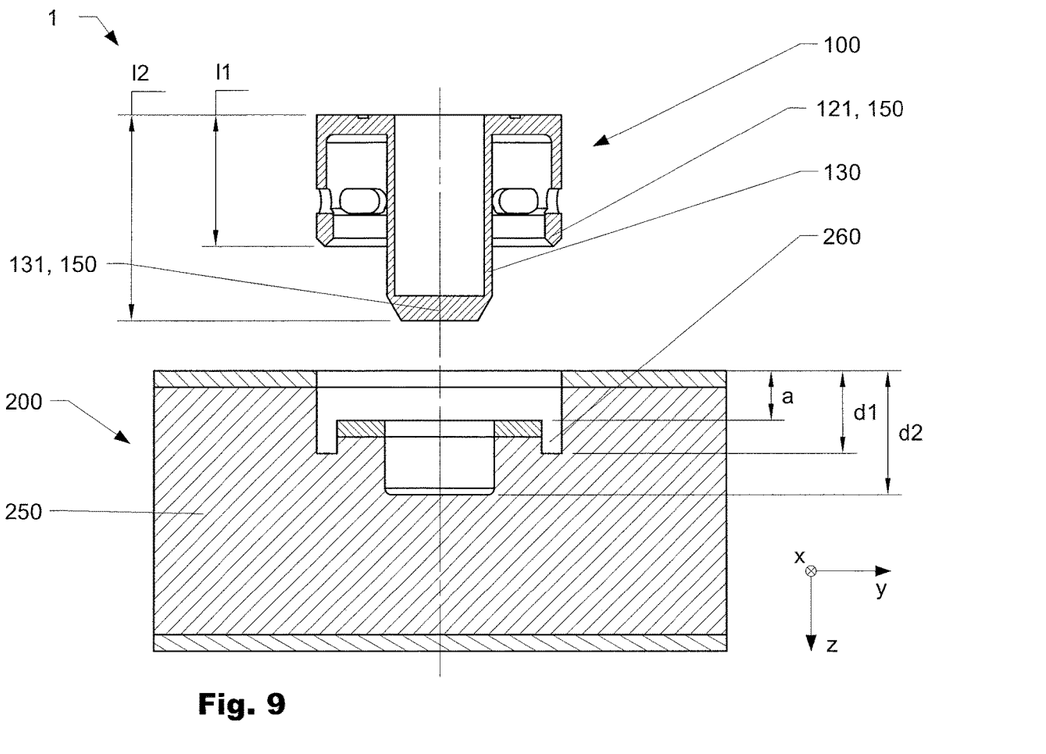
FIG. 9 schematically shows a cross section of another embodiment of an insert system prior to mounting of the insert.

FIG. 8 and FIG. 9 schematically show two different embodiments of an insert system 1 according to the invention, prior to mounting of the insert 100 into the panel 200. In the embodiment shown in FIG. 8, the trench 260 in the opening 212 has a depth d1, which is about equal to the distance l1 from the base 110 to the outer skirt end 121. The piston 300 has a recess 301 beneath which the opening 212 extends to a depth d2, which is about equal to the distance l2 from the base 110 to the inner skirt end 131. Hence, during mounting of the insert 100, neither the outer skirt end 121 nor the inner skirt end 131 applies a significant force in vertical direction z on the core structure 250 at the bottom region of the opening 212, respectively the trench 260. Such a configuration is particularly advantageous for panels 200 that have a relatively thin and/or mechanically sensitive second cover sheet 230 as significant loading of the core structure 250 close to the second cover sheet 230 may cause deformation and/or destruction of the second cover sheet 230. The insert 100 has an essentially circular shape with an outer diameter v1 which is slightly larger than the diameter g1 of the opening 212, such than in a mounted state, a force-fit will be established between the first outer skirt surface 123 and at least part of the first cover sheet 210. As also shown in FIG. 8, the inner diameter of the outer skirt 120 is slightly larger than the outer diameter of the piston 300, leading to a circumferential gap with width c2 as soon as the piston 300 sweeps along the first inner skirt surface 123. This gap is wide enough to serve as a second pathway for adhesive agent, as explained above. As also shown in FIG. 8, a protrusion 125 protrudes at the outer skirt end 121 from the first inner skirt surface 123 such that a smaller gap with width c1 is formed between the piston 300 and the outer skirt 120 when the piston 300 sweeps along the protrusion 125. The width c1 is dimensioned such that significant discharge of adhesive agent through the second pathway is prevented when the piston 300 sweeps along the protrusion 125. Due to the relatively high viscosity of most common adhesive agents, good results may be obtained with width c1 being less than about 0.3 mm and width c2 being more than about 0.5 mm. The width w1 of the trench 260 may be dimensioned such that a force-fit between the outer skirt end 120 and the core structure 250 surrounding the trench 260 may be obtained in order to use the outer skirt 120 as an anchoring means.

As illustrated in FIG. 9, for some configurations of inserts 100 and panels 200 the trench 260 in the opening 212 may a depth d1 that is less than the distance l1 from the base 110 of the insert 100 to the outer skirt end 121. The piston 300 has a recess 301 beneath which the opening 212 extends to a depth d2, which is also less than the distance l2 from the base 110 of the insert 100 to the inner skirt end 131. Hence, during mounting of the insert 100, the outer skirt end 121 and the inner skirt end 131 dive into the core structure 250 at the bottom of the opening 212 and thereby deform and/or cut the core structure 250. Thus, the inner skirt end 131 and/or the outer skirt end 121 may serve as some anchoring means 150 that restrict movements and/or rotations of the insert 1 with respect to the panel 200. As well, this process of diving into the core structure 250 causes a reaction force against that counteracts the insertion force F and hence allows better control of the mounting process.

Figure 10:
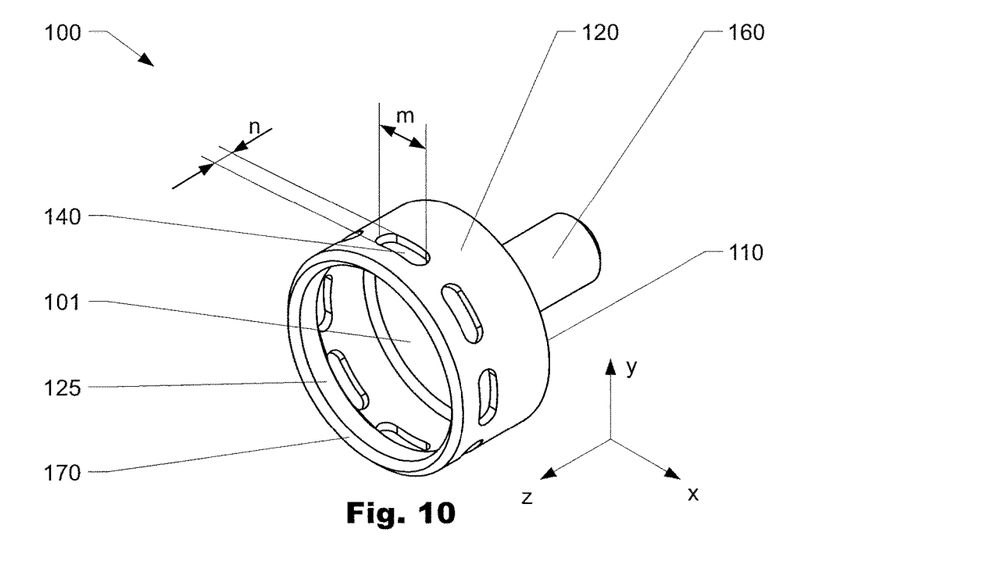
FIG. 10 schematically shows another embodiment of an insert in a perspective view from below.

FIG. 10 shows another embodiment of an insert 100 according to the invention, which has no inner skirt. Multiple passages 140 are arranged circumferentially distributed around the outer skirt 120. The passages 140 have a cross-section which has a first main dimension m of about 4 mm and a second main dimension n of about 1.5 mm. Passages 140 with such dimensions turned out to cause good distributions of adhesive agent into the core structure of some of a large variety of honeycomb panels. Hence, an insert 100 comprising passages 140 with these dimensions has a high versatility.

Figure 11:
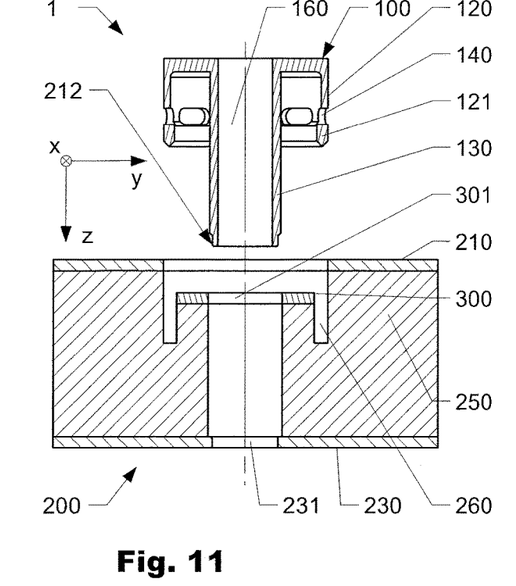
FIG. 11 schematically shows a cross section of another embodiment of an insert system prior to mounting of the insert.
Figure 12:
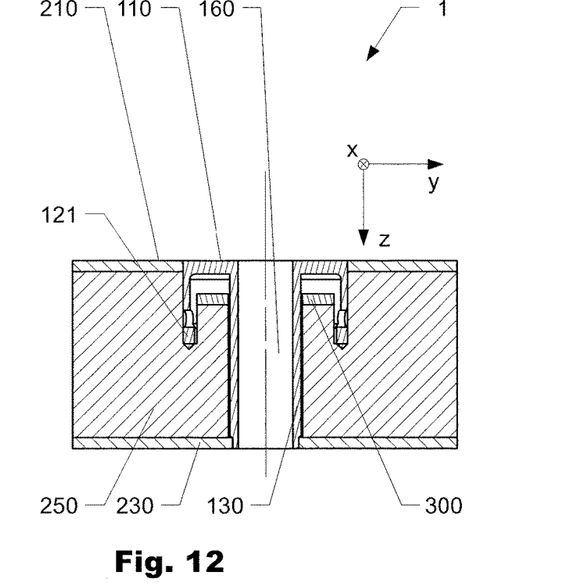
FIG. 12 schematically shows the insert system of FIG. 11, the insert being in a mounted state.

FIG. 11 and FIG. 12 show another embodiment of an insert system 1 according to the invention, which comprises an insert 100 that has a relatively long inner skirt 130 that extends from the first cover sheet 110 to the second cover sheet 130. Therefore, the opening 212 extends from a recess 301 in the piston 300 through the core structure 250 to a port 231 in a second cover sheet 230 arranged on the bottom side of the panel 200. As schematically indicated the inner skirt 130 is essentially formed as a hollow cylinder, having a through hole that serves as a connection means 160 in which e.g. a bolt or screw can be arranged, interconnecting the top and the bottom side of the panel 200.

Figure 13:
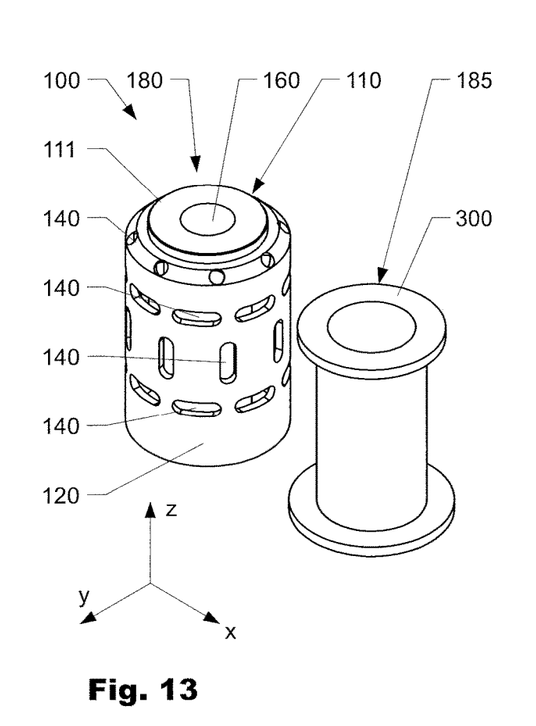
FIG. 13 schematically shows another embodiment of an insert comprising two insert parts in a perspective view from below.
Figure 14:
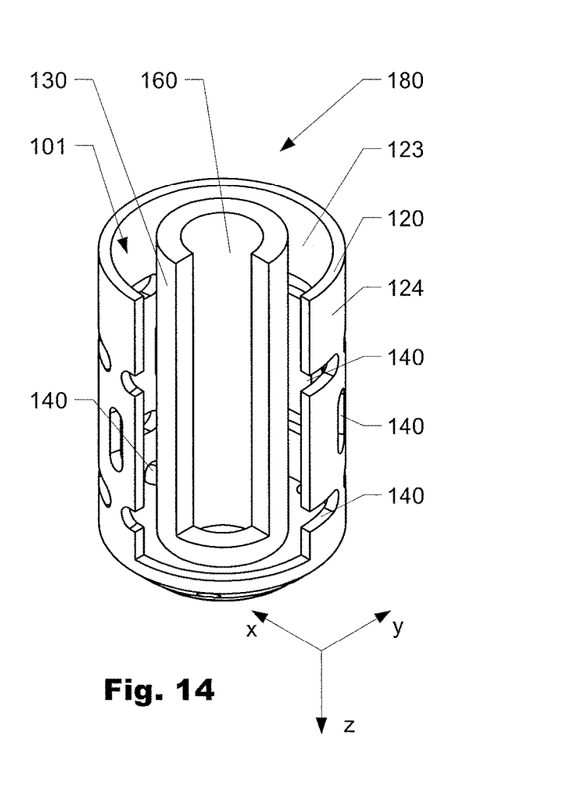
FIG. 14 shows a first insert part of the insert of FIG. 13, a portion of the insert part being clipped in a perspective view from above.

FIG. 13 and FIG. 14 schematically show another embodiment of an insert 100 according to the invention. The insert 100 comprises a first insert member 180 and a second insert member 185. The first insert member 180 has a base 110 and an outer skirt 120 extending from the base 110, thereby forming a chamber 101 to receive an adhesive agent (not shown). In the outer skirt 120 as well as the base 110 multiple passages 140 are arranged, interconnecting a first inner skirt surface 123 with a first outer skirt surface 124 forming a first pathway for discharging an adhesive agent (not shown) arranged in the chamber 101. In order to discharge at least part of the adhesive agent, the second insert member 185 can be pushed at least partially into the first insert member 180, whereby a piston 200 arranged at the second insert member effects discharge of the adhesive agent, as will be explained in more detail with reference to FIG. 15 to FIG. 17.

Figure 15:
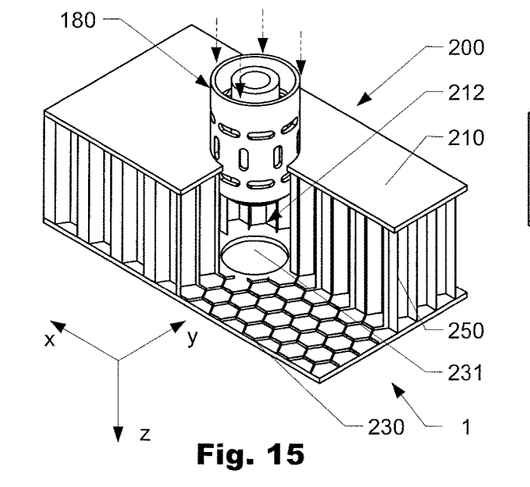
FIG. 15 schematically shows the insert of FIG. 13 and FIG. 14 during mounting of the insert, the first insert part being inserted in an opening, in a perspective view from above.
Figure 16:
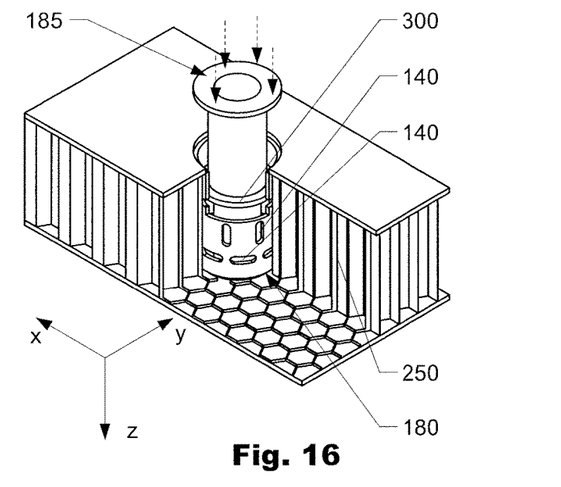
FIG. 16 schematically shows the insert of FIG. 13 and FIG. 14 during mounting of the insert in a perspective view from above; a second insert part being inserted in the first insert part, the first insert part being partially clipped for illustrative purposes, in a perspective view.
Figure 17:
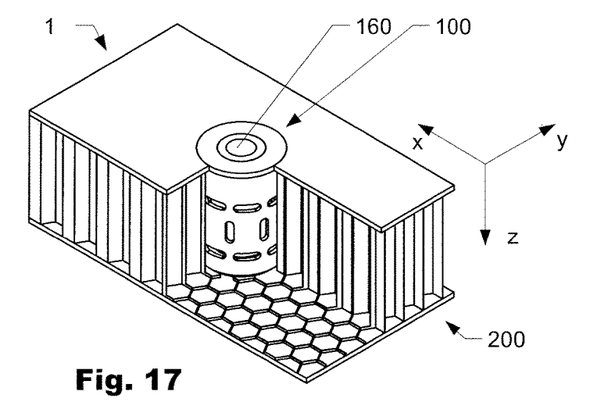
FIG. 17 schematically shows the insert of FIG. 13 to FIG. 16 in mounted state.

As shown in FIG. 15, an embodiment of an insert system 1 comprising an insert 100 as shown in FIG. 13 and FIG. 14 may be obtained by first inserting the first insert member 180 into an opening in the first cover sheet 210, the opening extending through the core structure 250 to a second cover sheet 230 arranged on the other side of the panel 200. In the second cover sheet 230, a port 231 is arranged to receive a projection 111 arranged at the base 110 of the first insert member 180. As soon as the first insert member 180 is mounted in the opening 212, the projection 111 seals the port 231 and the second insert member 185 is pushed into the first insert member 180, whereby the piston 300 causes at least part of the adhesive agent arranged in the first insert member 180 to be discharged via the passages 140 into the peri-insert core structure 250, as shown in FIG. 16. As shown e.g. in FIG. 13, some passages 140 of the first insert member 180 may be arranged close to the base 110. Adhesive agent discharged via these passages 140 will typically help to establish an adhesive interconnection between the first insert member 180 and the second cover sheet 230, which significantly increases the mechanical load-carrying capability of the insert. Such an alignment of at least one passage may also be regarded as an independent inventive concept, independent of the aforementioned features of the first and the second insert member 180, 185. When inserting the first insert member 180 into the panel, the second insert member 185 may already be partly arranged in the first insert member 180, or may alternatively be disconnected from it and be interconnected with it as soon as the first insert member 180 is mounted in the opening 212. FIG. 17 shows the embodiment of an insert 100 of FIG. 13 to FIG. 16 with the first and the second insert member 180, 185 being fully mounted in the panel 200.

Figure 18A:
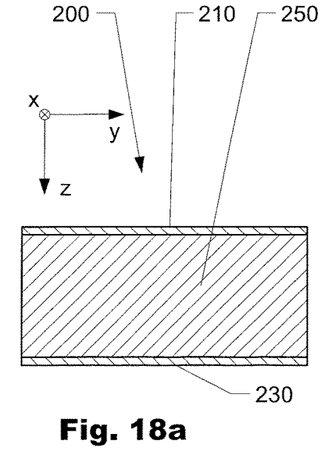
FIG. 18a schematically illustrates one method step of an embodiment of a method for producing an insert system.
Figure 18B:
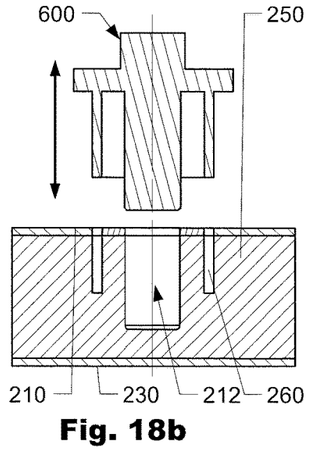
FIG. 18b schematically illustrates one method step of an embodiment of a method for producing an insert system.
Figure 18C:
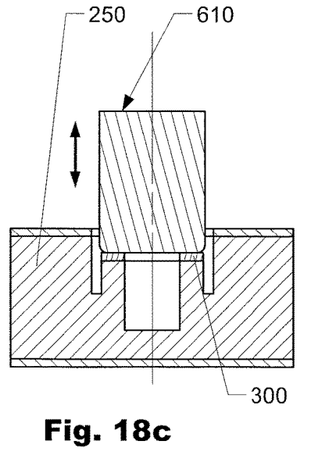
FIG. 18c schematically illustrates one method step of an embodiment of a method for producing an insert system.
Figure 18D:
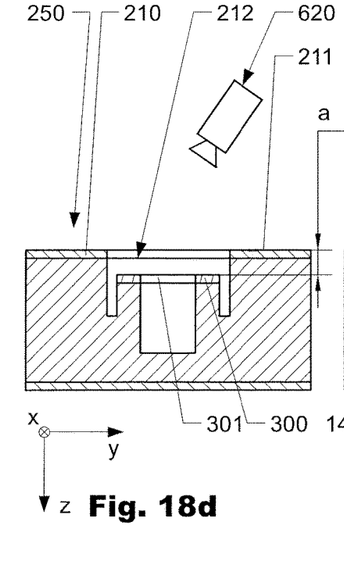
FIG. 18d schematically illustrates one method step of an embodiment of a method for producing an insert system.
Figure 18E:
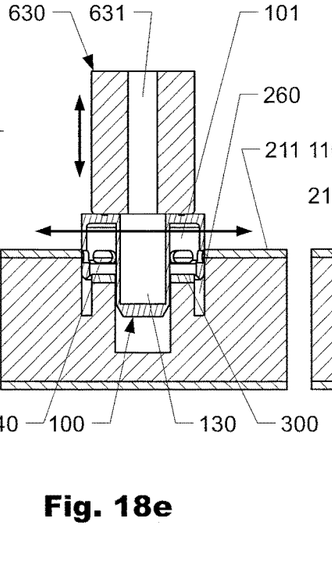
FIG. 18e schematically illustrates one method step of an embodiment of a method for producing an insert system.
Figure 18F:
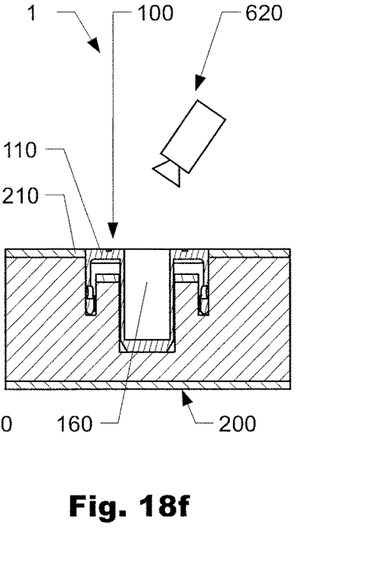
FIG. 18f schematically illustrates one method step of an embodiment of a method for producing an insert system.

FIG. 18a-f schematically illustrate an embodiment of a method to produce an insert system 1 with an embodiment of an insert 100 as shown e.g. in FIG. 1. In a first step shown in FIG. 18*a*, a panel 200 is provided, comprising a core structure and a first and a second cover sheet 210, 230. In a subsequent step—schematically illustrated in FIG. 18*b*—an opening 212 is induced in the first cover sheet 210, as well as part of the core structure 250. This may be done by means of an opening tool 600, such as a drill. The embodiment of an opening tool 600 shown is formed such that an annular part of the first cover sheet 210 is separated from the rest of the first cover sheet 210 by a trench 260. In a subsequent method step, illustrated in FIG. 18*c*, the annular part is displaced in vertical direction z into the panel 200 (beneath the first outer panel surface) by means of an indenter 610 by a certain distance, forming a piston 300. As schematically shown in FIG. 18*d*, the offset a between the piston 300 and the cover sheet 210 (respectively the first outer panel surface 211) may be measured in a subsequent method step, e.g. using an optical detector 620. If the offset a is within a predefined range of values, in a subsequent method step an insert 100 may be inserted, as will be shown in FIG. 18*e*. If the offset is less than a certain minimum value, the piston 300 may be displaced again and to a larger extent by the indenter 610 and the offset a may be measured again. This methods steps may be repeated with increasing values for the displacement applied by the indenter 610, until a desired offset a is obtained. In order to mount the insert 100, the insert may be inserted using a special insertion tool 630 formed to generate displacement of the insert 100 in vertical direction z, while allowing free movements of the insert 100 with respect of the panel 200 in transversal direction x/y. Thus a self-alignment of the insert 100 and the opening 212 becomes possible. Free movements in transversal direction x/y may be obtained by using a vacuum system 631 which keeps the insert 100 aligned with a frontal effective face of the insertion tool 630. If an insert 100 as shown in FIG. 11 and FIG. 12 has to be mounted, a peelable foil may be arranged at the outer face of the base 110, sealing the opening of the inner skirt 130 and hence supporting the vacuum system 631. After the insert 100 has been displaced to a predefined value in vertical direction, as shown in FIG. 18*f*, the position of the insert 100 with respect to the panel 200 may be detected again, using e.g. an optical detector 620. Therefore, the insertion tool 630 may be temporarily lifted from the insert 100 or may stay interconnected with the insert 100. Good results may be obtained if the insertion tool 630 is at least temporarily lifted from the insert 100 during detection of the position of the insert 100 with respect to the panel 200 in order to allow potential spring-back of the insert 100 due to elastic behavior of the panel 200 and/or the insert 100. If the insert 100 protrudes from the first cover sheet 210, it may be displaced to a larger extent by an insertion tool 630 in vertical direction z during a subsequent method step. Hence, proper alignment of the top surface of the insert's 100 base 110 and the first cover sheet 210 can be obtained, taking elastic behavior of the panel 200 and/or the insert 100 into account. Therefore, the insert 100 may even be displaced beneath the first outer panel surface 211 in order to compensate for spring-back (in negative z-direction) of the insert 100 after removal of the insertion tool 630. The embodiment of an insertion tool 630 shown in FIG. 18*e* has a smaller dimension than the insert 100 in a plane (x/y) that is transversal to the direction of mounting of the insert 100 (z-direction). Thus, collisions between the insertion tool 630 and the first cover sheet 210 can be prevented, even if the base of the insert 100 is displaced beneath the first outer surface 211. The embodiment of an insertion tool 630 shown has particularly small dimensions in the x/y-plane, such that collisions can be prevented even if self-alignment of the insert 100 takes place.

Figure 19:
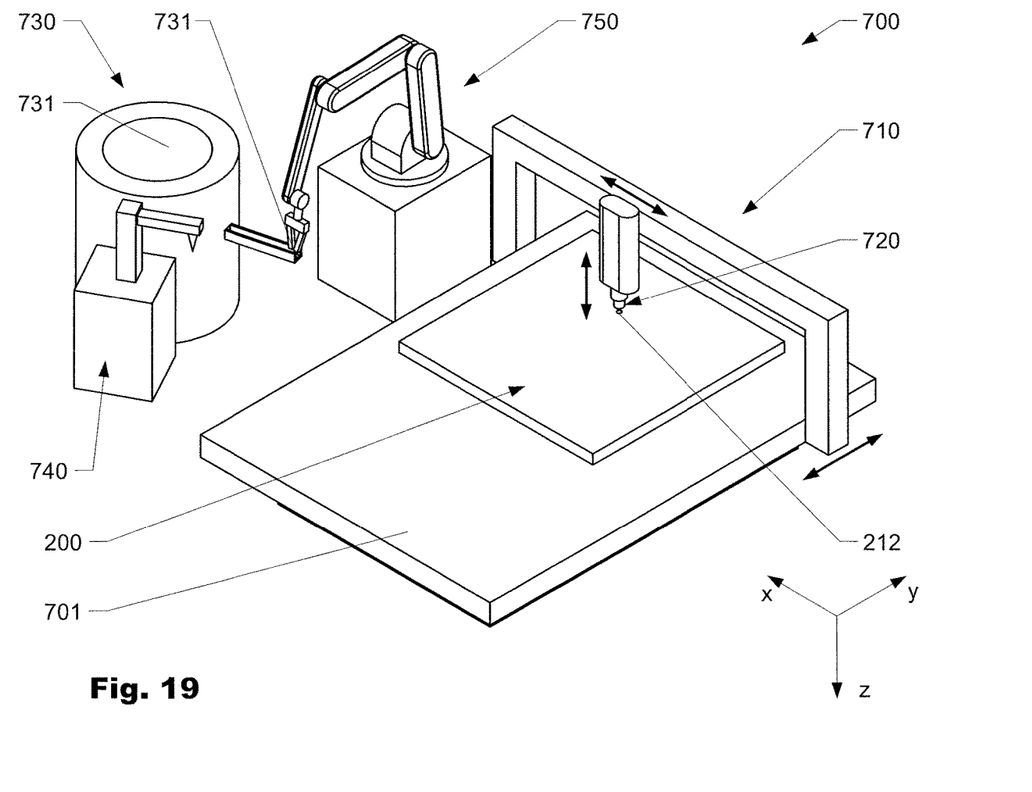
FIG. 19 schematically shows an embodiment of a device for producing an insert system.

FIG. 19 schematically shows a device 700 for producing an embodiment of an insert system according to the present invention. The device comprises a holding device 710 for holding/supporting a panel 200, the holding device 710 being formed as a table comprising a vacuum system to hold the panel 200. The device 700 further comprises a processing head 720 that is displaceable with respect to the panel 200 and configured to receive an opening tool (not shown in detail) to induce an opening 212 into the panel 200 at a predefined position. The device 700 further comprises an insertion tool (not shown in detail) displaceable with respect to the panel 200 and configured to support an insert (not shown in detail) to be inserted in the opening 212. As shown in FIG. 19, the processing head 720 may also be configured to receive the insertion tool. Alternatively or in addition, the insertion tool may be separated from the processing head 720. The device 700 also comprises an insert dispenser 730 for dispensing of inserts (not shown in detail) to be inserted in the panel 200. The insert dispenser 730 comprises a storage 731 in order to store large amounts of inserts, as well as a discharge point 732 where inserts are provided to a handling device 750, which in the embodiment shown is a robot arm. The handling device 750 is arranged to take an insert from the discharge point 732 and move it to an adhesive dispenser 740, where an adhesive agent is filled in the chamber arranged in the insert. As schematically illustrated, the adhesive dispenser 740 may be positioned spatially separated from the holding device 710, respectively the panel 200. Hence, pollution of the panel by the adhesive dispenser 740 can be prevented. As soon as a specified amount of adhesive agent is filled into the chamber, the handling device 750 will convey and deliver the insert to the insertion tool in order to mount the insert into an opening 212

The invention claimed is:
1. An insert system (1) comprising:
 a. an insert (100) comprising
  i. a base (110) and
  ii. an outer skirt (120) extending from
   1. the base (110), thereby forming a chamber (101),
   2. the outer skirt (120) being provided with
  i. a first inner skirt surface (123) and a first outer skirt surface (124); and
 b. a panel (200) comprising
  i. a core structure (250) and
  ii. a first cover sheet (210) that at least partially covers the core structure (250);
   1. the first cover sheet (210) defining a first outer panel surface (211) and
   2. having an opening (212); and
 c. at least one piston (300) arranged as part of the panel (200) in the opening (212) and beneath the first outer panel surface (211), wherein the at least one piston (300) is offset from the first outer panel surface (211) in a vertical direction (z) by an offset distance (a); and
 d. wherein the at least one piston (300) during mounting of the insert (100) sweeps into the chamber (101) to discharge an adhesive agent (400) from the chamber (101) into the core structure (250) via at least one pathway (P1).
2. The insert system (1) according to claim 1, wherein opening (212) comprises a trench (260) in the core structure (250) that surrounds the piston (300).

3. The insert system (1) according to claim 2, wherein the outer skirt (120) comprises a free outer skirt end (121) that is arranged such that it interlocks with the trench (260) when the piston (300) sweeps into the chamber (101) and thereby at least temporarily positions the insert (100) with respect to the panel (200).

4. The insert system (1) according to claim 1, wherein an inner skirt (130) extends from the base (110) and is arranged in the chamber (101) and spaced a distance apart from the outer skirt (120).

5. The insert system (1) according to claim 4, wherein the inner skirt (130) is closed at a free inner skirt end (131).

6. The insert system (1) according to claim 4, wherein the piston (300) comprises at least one recess (301) arranged to receive the inner skirt (130).

7. The insert system (1) according to claim 1, wherein a free outer skirt end (121) and/or a free inner skirt end (131) comprises at least one guiding means (170) that facilitates insertion of the insert (100) into the opening (212).

8. The insert system (1) according to claim 1, wherein an inner skirt (130) and/or the outer skirt (120) comprises an anchoring means (150) that at least temporarily interacts with the core structure (250) and/or the first cover sheet (210) and/or a second cover sheet (230) that at least partially covers the core structure (259) to restrict movements and/or rotations of the insert (1) with respect to the panel (200).

9. The insert system (1) according to claim 1, wherein at least one passage (140) is arranged at the outer skirt (120), interconnecting the first inner skirt surface (123) with the first outer skirt surface (124) forming a first pathway (P1) to discharge part of the adhesive agent (400) to the outside of the insert (100) into the core structure (250).

10. The insert system (1) according to claim 9, wherein the insert (100) comprises multiple passages (140) arranged circumferentially distributed around the outer skirt (120).

11. The insert system (1) according to claim 1, wherein when the piston (300) is arranged in the chamber (101), a gap (10) is defined between the piston (300) and the outer skirt (120), forming an additional pathway (P2) separate from the at least one pathway (P1) to discharge part of the adhesive agent (400) into the core structure (250).

12. The insert system (1) according to claim 11, wherein a protrusion (125) arranged in the second pathway (P2) protrudes from the first inner skirt surface (123) constricting the gap (10) when the piston (300) sweeps along the protrusion (125) and thereby limits discharge of adhesive agent (400) via the second pathway (P2).

13. The insert system (1) according to claim 12, wherein the at least one passage (140) is arranged between the protrusion (125) and the base (110).

14. The insert system (1) according to claim 1, wherein in a mounted state a force-fit is established between the first outer skirt surface (123) and at least part of the first cover sheet (210), restricting displacements and rotations of the insert (100) with respect to the first cover sheet (210).

15. The insert system (1) according to claim 1, wherein the piston (300) is at least partially made from the first cover sheet (210) and/or the core structure (250) of the panel (200).

16. An insert system (1) comprising:
   a. an insert (100) comprising
      i. a base (110) and
      ii. an outer skirt (120) extending from
         1. the base (110), thereby forming a chamber (101),
         2. the outer skirt (120) being provided with a first inner skirt surface (123) and a first outer skirt surface (124); and
   b. a panel (200) comprising
      i. a core structure (250) and
      ii. a first cover sheet (210) that at least partially covers the core structure (250);
         1. the first cover sheet (210) defining a first outer panel surface (211) and
         2. having an opening (212); and
   c. at least one piston (300) arranged in the opening (212) and beneath the first outer panel surface (211), wherein the piston (300) is at least partially made from the first cover sheet (210) and/or the core structure (250) of the panel (200); and
   d. wherein the at least one piston (300) during mounting of the insert (100) sweeps into the chamber (101) to discharge an adhesive agent (400) from the chamber (101) into the core structure (250) via at least one pathway (P1, P2).

17. The insert system (1) according to claim 16, wherein the piston (300) is offset from the first outer panel surface (211) in a vertical direction (z) by an offset distance (a).

* * * * *